US009947950B2

(12) United States Patent
Arisetty et al.

(10) Patent No.: US 9,947,950 B2
(45) Date of Patent: Apr. 17, 2018

(54) SYSTEMS AND METHODS FOR INITIATING VOLTAGE RECOVERY IN A FUEL CELL SYSTEM

(71) Applicant: GM GLOBAL TECHNOLOGY OPERATIONS LLC, Detroit, MI (US)

(72) Inventors: Srikanth Arisetty, Novi, MI (US); Andrew J. Maslyn, Novi, MI (US); Balasubramanian Lakshmanan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 14/869,467

(22) Filed: Sep. 29, 2015

(65) Prior Publication Data

US 2017/0092971 A1 Mar. 30, 2017

(51) Int. Cl.

| | |
|---|---|
| ***H01M 8/04701*** | (2016.01) |
| ***H01M 8/04537*** | (2016.01) |
| ***H01M 8/0444*** | (2016.01) |
| ***H01M 8/04828*** | (2016.01) |

(52) U.S. Cl.

CPC ..... *H01M 8/04723* (2013.01); *H01M 8/0444* (2013.01); *H01M 8/04559* (2013.01); *H01M 8/04604* (2013.01); *H01M 8/04835* (2013.01)

(58) Field of Classification Search

None

See application file for complete search history.

(56) References Cited

U.S. PATENT DOCUMENTS

2011/0195324 A1* 8/2011 Zhang ................ H01M 8/0258 429/413

* cited by examiner

*Primary Examiner* — Tom Thomas
*Assistant Examiner* — Steven B Gauthier
(74) *Attorney, Agent, or Firm* — Phillips Ryther & Winchester; John P. Davis

(57) ABSTRACT

Systems and methods for initiating voltage recovery procedures in a fuel cell system based in part on an estimated specific activity over the life of a fuel cell catalyst are presented. In certain embodiments, SA loss of catalyst and electrochemical surface area loss of a FC system may be estimated. An output voltage of the FC system may be estimated based on the estimated SA loss and the electrochemical surface area loss. An amount of recoverable voltage loss may be determined based on a comparison between the estimated output voltage and a measured output voltage. Based on the determined amount of recordable voltage loss, a FC system control action (e.g., a voltage recovery procedure) may be initiated.

18 Claims, 4 Drawing Sheets

SYSTEMS AND METHODS FOR INITIATING VOLTAGE RECOVERY IN A FUEL CELL SYSTEM

TECHNICAL FIELD

This disclosure relates to systems and methods for initiating voltage recovery in a fuel cell system. More specifically, but not exclusively, this disclosure relates to systems and methods for initiating voltage recovery in a fuel cell system based in part on an estimated specific activity of an associated fuel cell catalyst.

BACKGROUND

Passenger vehicles may include fuel cell ("FC") systems to power certain features of a vehicle's electrical and drivetrain systems. For example, a FC system may be utilized in a vehicle to power electric drivetrain components of the vehicle directly (e.g., using electric drive motors and the like) and/or via an intermediate battery system. Hydrogen is one possible fuel that may be used in a FC system. Hydrogen is a clean fuel that can be used to efficiently produce electricity in a FC system. A hydrogen FC system is an electrochemical device that may include an electrolyte between an anode and a cathode. The anode receives hydrogen gas and the cathode receives oxygen or air. The hydrogen gas is dissociated in the anode to generate free hydrogen protons and electrons. The hydrogen protons may be selectively conducted across the electrolyte. The electrons from the anode cannot pass through the electrolyte, and thus are directed through a load to perform work before being sent to the cathode. The hydrogen protons react with the oxygen and the electrons in the cathode to generate water.

Proton exchange membrane fuel cells ("PEMFC") may be used in FC-powered vehicles. A PEMFC generally includes a solid polymer electrolyte proton conducting membrane, such as a perfluorosulfonic acid membrane. An anode and cathode included in a PEMFC may include finely divided catalytic particles (e.g., platinum particles) supported on carbon particles and mixed with an ionomer. A catalytic mixture may be deposited on opposing sides of the membrane.

Over time, a PEMFC may experience operating voltage loss due to a variety of mechanisms and/or processes, thereby reducing performance of the PEMFC. Some PEMFC voltage loss may be recoverable by initiating voltage recovery procedures in the PEMFC, while others may not be recoverable (e.g., losses attributable to electrode degradation or the like). Certain voltage recovery procedures may, however, cause some minimal unrecoverable degradation to the PEMFC. Accordingly, such procedures should be initiated when voltage loss recovery may be effectively realized. It may be further difficult to differentiate recoverable voltage loss from unrecoverable voltage loss, thereby making it difficult to determine when voltage recovery procedures should be performed. Conventional methods may not provide for sufficiently accurate estimation of voltage over the operation life of a FC system, thereby reducing fuel efficiency over the life of the FC system.

SUMMARY

Systems and methods presented herein may be utilized in connection with initiating a voltage recovery procedure in a FC system. As used herein, an FC system and/or a PEMFC system may include a single cell or, alternatively, may include multiple cells arranged in a stack configuration. In certain embodiments, initiating a voltage recovery procedure at a time when the FC system is experiencing a certain threshold amount of recovery voltage loss may allow for voltage recovery to be realized while reducing any FC degradation caused by the voltage recovery procedure. Embodiments disclosed herein may be further used to initiate a voltage recovery procedure during a time at which such a procedure is not expected to adversely impact performance of an associated vehicle (e.g., during low vehicle use periods or the like).

Various modes of degradation in a FC system may be associated with unrecoverable voltage loss. For example, irreversible and/or otherwise unrecoverable voltage loss may be attributed to loss of electrochemical surface area ("ECA") in the FC system and loss of catalyst specific activity ("SA"). Anode and/or cathode contamination, however, may result in recoverable voltage loss.

As discussed above, when viewing total voltage loss alone, it may be difficult to differentiate recoverable voltage loss from unrecoverable voltage loss, thereby complicating quantifying an amount of possible voltage recovery from the total voltage loss that may be realized by a voltage recovery procedure. Consistent with embodiments disclosed herein, unrecoverable voltage loss may be determined based on an estimated ECA loss and an estimated catalyst SA loss. Based on the determined unrecoverable voltage loss and the total voltage loss, an amount of recoverable voltage loss may be determined, which may be used in connection with determining at time to initiate a voltage recovery procedure in the FC system.

In some embodiments, a method for initiating a voltage recovery procedure in a FC system (e.g., operating the FC system at a lower than standard operational flow rate and voltage, increasing humidification of the FC system, increasing cooling of the fuel cell system by an associated cooling for a period of time, etc.) may include estimating SA loss of a catalyst of the FC system based on an amount of oxide growth and/or an oxide growth rate, estimating electrochemical surface area loss of the FC system, and estimating an output voltage of the FC system based on the estimated SA loss and the electrochemical surface area loss (e.g., using a performance model of the FC system at a set current density or the like). An output voltage of the FC system may be measured, and an amount of recoverable voltage loss may be determined based on a comparison between the estimated output voltage and the actual output voltage. If the determined amount of recoverable voltage loss exceeds a threshold, at least one FC system control action (e.g., a voltage recovery procedure) may be initiated and/or triggered at a later time.

In certain embodiments, the aforementioned method may be performed by control electronics associated with a PEMFC system and/or implemented using a non-transitory computer-readable medium storing associated executable instructions.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Systems and methods disclosed herein may be utilized in connection with determining an amount of recoverable voltage loss in a FC system based in part on a total voltage loss, an estimated ECA loss and an estimated catalyst SA loss. For example, in some embodiments, an estimated ECA and catalyst SA loss may be used to determine an unrecoverable voltage loss. Based on the determined unrecoverable voltage loss and the total voltage loss, an amount of recoverable voltage loss may be determined. In some embodiments, the determined amount of recoverable voltage loss may be used in connection with determining at time to initiate a voltage recovery procedure in the FC system.

Figure 1:
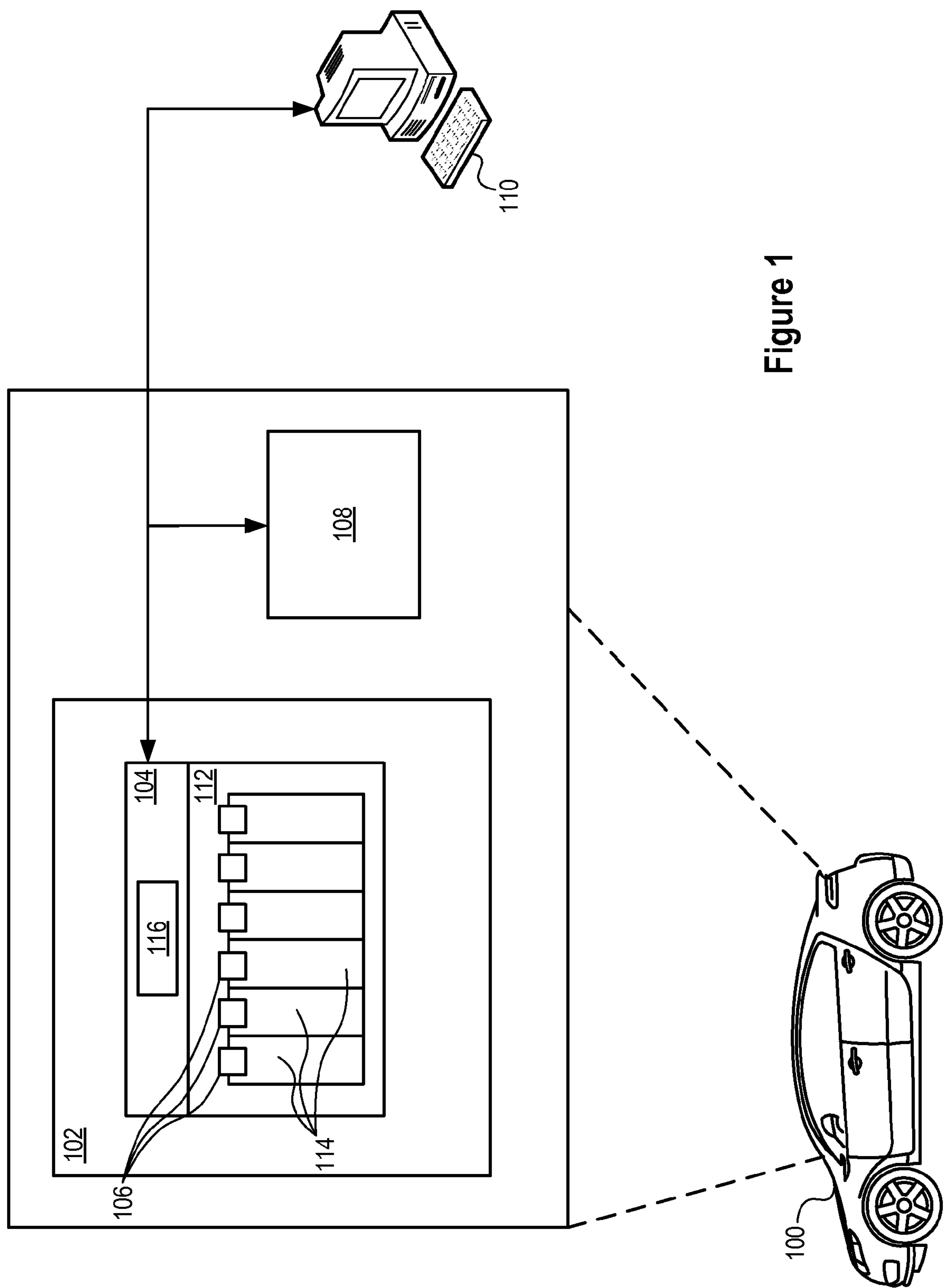
FIG. 1 illustrates a diagram of a FC system included in a vehicle consistent with embodiments disclosed herein.

FIG. 1 illustrates a diagram of a FC system 102 included in a vehicle 100 consistent with embodiments disclosed herein. The vehicle system 100 may be a motor vehicle, a marine vehicle, an aircraft, and/or any other type of vehicle, and may include any suitable type of drivetrain for incorporating the systems and methods disclosed herein. Additional embodiments of the disclosed systems and methods may be utilized in connection with any other type of FC system 102 including, for example, stationary FC systems (e.g., back-up power for a building and/or the like).

The vehicle 100 may include an FC system 102 including a FC stack 112 that, in certain embodiments, may be coupled with a high-voltage ("HV") battery system (not shown). The HV battery system may be used to power electric drivetrain components (not shown) of the vehicle 100. In further embodiments, the FC stack 112 may be coupled with a low voltage battery and may be configured to supply electric energy to a variety of vehicle 100 systems including, for example, vehicle starter systems (e.g., a starter motor), lighting systems, ignition systems, climate control systems, and the like. In yet further embodiments, the FC system 102 may be configured to directly power certain vehicle systems. In some embodiments, the FC system 102 may comprise a single cell or, as illustrated, may include multiple cells 114 arranged in a stack configuration.

The FC stack 112 may be associated with a FC control system 104. The FC control system 104 may be configured to monitor and control certain operations of the FC stack 112. For example, the FC control system 104 may be configured to monitor and control adjustable performance parameters and/or manage charge and discharge operations of the FC stack 112. In certain embodiments, the FC control system 104 may be communicatively coupled with one or more sensors 106 (e.g., voltage sensors, current sensors, and/or the like, etc.) and/or other systems configured to enable the FC control system 104 to monitor and control operations of the FC stack 112 and/or its constituent cells 114.

Consistent with embodiments disclosed herein, the sensors 106 in communication with the FC stack 112 may provide the FC control system 104 and/or other systems (e.g., internal vehicle computer system 108 and/or an external computer system 110) with information that may be used to estimate ECA loss and/or estimate catalyst SA loss, determine an estimated unrecoverable voltage loss, determine an estimated recoverable voltage loss, and/or determine a total voltage and/or total voltage loss. The FC control system 104 may further be configured to provide information to and/or receive information from other systems included in the vehicle 100. For example, the FC control system 104 may be communicatively coupled with an internal vehicle computer system 108 and/or an external computer system 110.

The control system 104 may comprise an internal control system, an external control system, and/or any other vehicle control and/or computer system. In further embodiments, the control system 104 may be configured to provide information to and/or receive information from other systems included in the vehicle 100 and/or an operator of the vehicle 100. Although illustrated in connection with a single control system 106, it will be appreciated that embodiments of the disclosed systems and methods may be implemented using a plurality of suitable control and/or computing systems.

In some embodiments, the control system 104, the internal vehicle computer system 108 and/or external computer system 110 may comprise a module 116 that when executed by the control system 104, and/or the internal vehicle computer system 108 and/or external computer system 110, cause the systems 104, 108, and/or 110 to implement embodiments of the disclosed systems and methods. For example, in some embodiments, the module 116 may cause the systems 104, 108, and/or 110 to determine an amount of recoverable voltage loss in a FC system based in part on a total voltage loss, an estimated ECA loss and an estimated catalyst SA loss. In further embodiments, the module 116 may cause the systems 104, 108, and/or 110 to initiate a voltage recovery procedure in the FC system based, at least in part, on the determined amount of recoverable voltage loss.

It will be appreciated that a number of variations can be made to the architecture, relationships, and examples presented in connection with FIG. 1 within the scope of the inventive body of work. For example, certain device and/or system functionalities described above may be integrated into a single device and/or system and/or any suitable combination of devices and/or systems in any suitable configuration. Similarly, although certain embodiments of the disclosed systems and methods are described as being implemented by the FC control system 104, it will be appreciated that the internal vehicle computer system 108, external computer system 110, and/or any other computer system may implement embodiments disclosed herein. Thus it will be appreciated that the architecture, relationships, and examples presented in connection with FIG. 1 are provided for purposes of illustration and explanation, and not limitation.

Figure 2A:
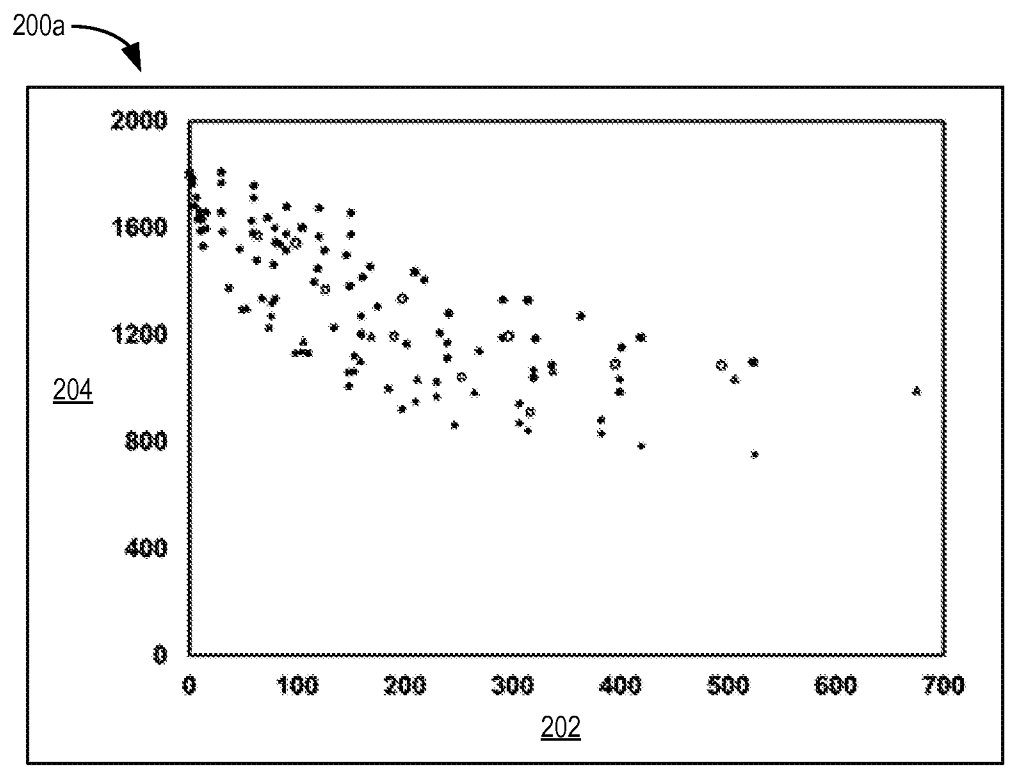
FIG. 2A illustrates a graph showing an exemplary relationship between SA loss and cycle time for a plurality of voltage cycling tests of an exemplary FC system consistent with embodiments disclosed herein.

FIG. 2A illustrates a graph 200*a* showing an exemplary relationship between SA 204 (e.g., expressed in terms of $\mu A/cm^2_{Pt}$) and cycle time 202 (e.g., expressed in terms of hours) for a plurality of voltage cycling tests of an exemplary FC system. Particularly, graph 200*a* illustrates SA 204 loss versus cycle time 202 for 25 exemplary voltage cycling tests of an FC system that account for temperature and relative humidity variation. As illustrated, as the cycle time 202 increases, the SA 204 of the FC catalyst may decrease, thereby contributing to unrecoverable voltage loss in the FC system.

Figure 2B:
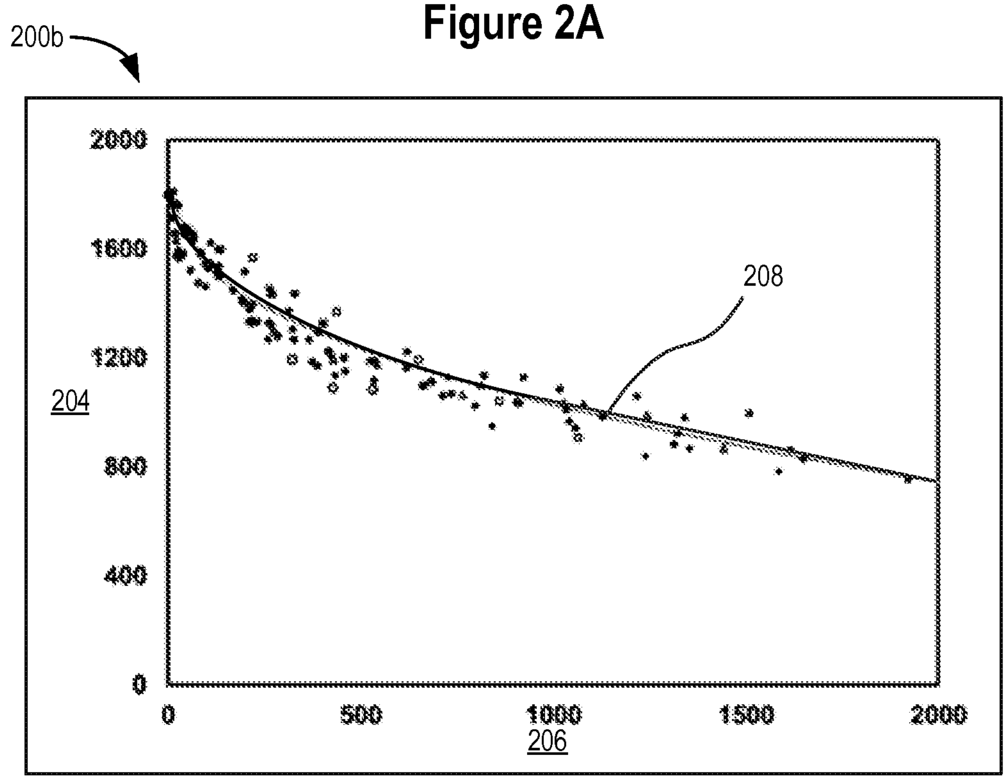
FIG. 2B illustrates a graph showing an exemplary correlation between SA loss and a total oxidation charge in an exemplary FC system consistent with embodiments disclosed herein.

FIG. 2B illustrates a graph 200*b* showing an exemplary correlation (e.g., line 208) between SA 204 and a total oxidation charge and/or a damage factor ("φ") 206 in an exemplary FC system consistent with embodiments disclosed herein. In certain embodiments, a FC system may utilize a catalyst comprising platinum ("Pt" or "Pt Alloy"), which may oxidize in the FC system to form two states of oxide, PtO and PtOO. In certain embodiments, an oxide model may be used to calculate an amount of PtO and/or PtOO growth in the FC system and/or the rate of oxide growth over time.

For example, in some embodiments, a module executed by a FC control system (e.g., an internal and/or external vehicle control system) may determine two states of oxide, PtO and PtOO, in-situ during a drive cycle using a suitable oxide model. In some embodiments, the inputs to the oxide model may include various drive cycle parameters including, for example, current density, cell voltage, temperature, and/or relative humidity. Based, at least in part on this information, the oxide model may provide an estimate as to an amount of PtO and/or PtOO growth in the FC system and/or the rate of oxide growth over time.

In certain embodiments, information relating to oxide growth in the FC may be used in connection with estimating SA 204 of the FC. In certain embodiments, SA 204 of the FC at a given time may be expressed according to the following:

$$i_{S.A,t=T}=i_{S.A,t=0}(1-a(\varphi/b)^{\beta}) \quad \text{Eq. 1}$$

where, a, b, and β are constants determined based on characterization testing of a particular FC design, and φ is a total oxidation charge and/or a damage factor. In some embodiments, testing may be performed on an FC to obtain data on specific activity decay based on factors including, for example, voltage cycle, temperature, and/or relative humidity. In certain embodiments, this testing may provide certain data illustrated in graph 200*a*. Using an oxide model, a total oxidation charge, which may be given according to Eq. 2 presented below, may be obtained to various voltage cycles. The functional form of Eq. 1 may be used to obtain parameters a and b so as to reduce and/or otherwise minimize error between the data and the model. In some embodiments, two or three data sets may be sufficient to obtain parameters a, b, and β although any suitable number of datasets may also be used.

In some embodiments, the total oxidation charge and/or a damage factor may be given by the following:

$$\varphi = 1/2\int_{t=0}^{T}\left(|d\theta_{PtO}/dt| + k\frac{\theta_{PtO}}{\theta_{PtO}+\theta_{PtOO}}\right)dt$$

where, k, n and m are constants determined based on characterization testing of a particular FC design. In some embodiments, additional terms may be used to improve alignment of measured datasets with the correlation expressed in Eq. 1.

Figure 3:
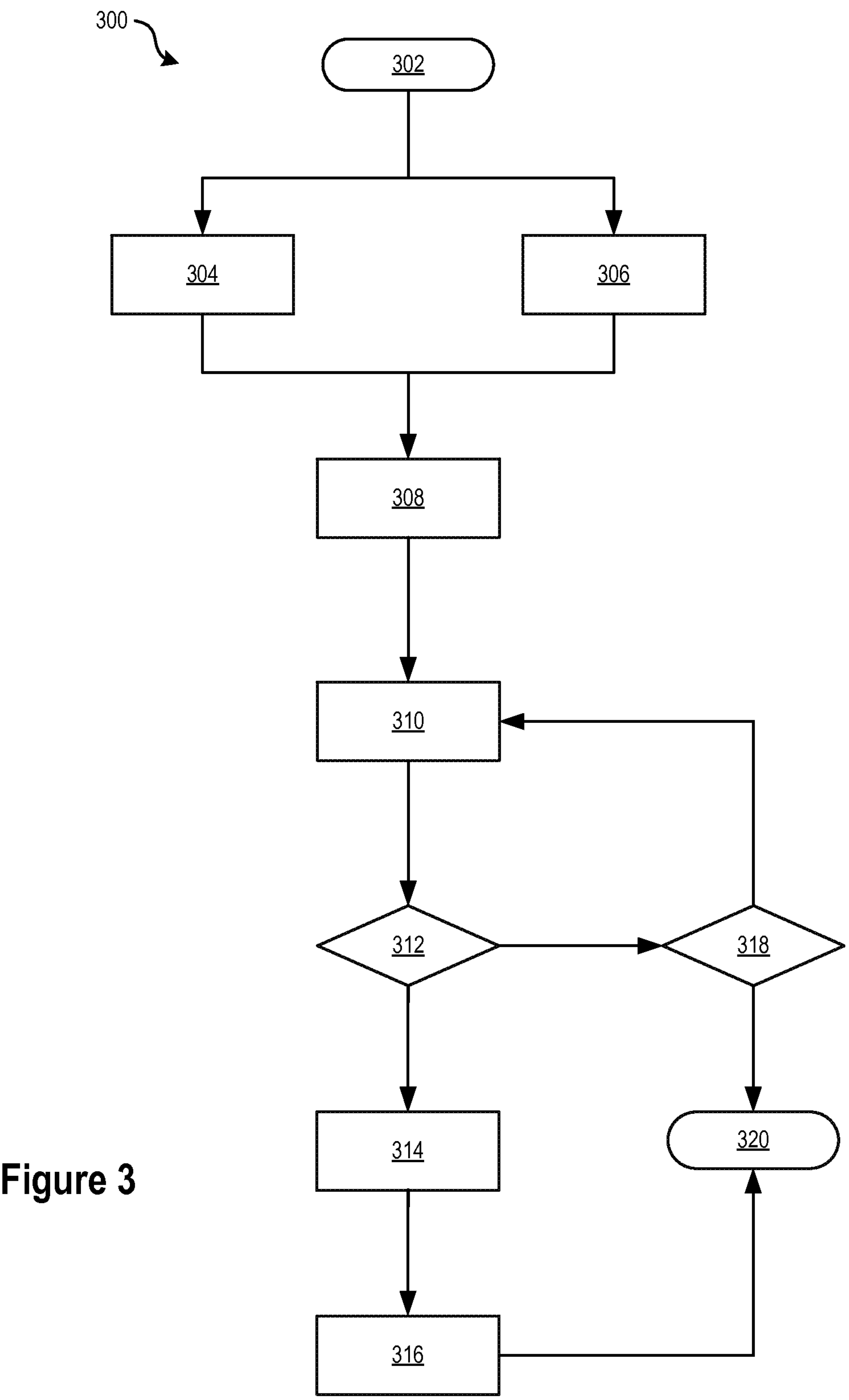
FIG. 3 illustrates a flow chart of an exemplary method for initiating voltage recovery in a FC system consistent with embodiments disclosed herein.

In some embodiments, SA decay may be related to loss of alloying element from the catalyst during a drive cycle. Injection of vacancies from the oxidation/reduction process that occurs during voltage cycling of a FC stack may further cause decay of the catalyst surface activity. A total oxidation charge and/or a damage factor, φ, may relate to the total vacancies injected during voltage or drive cycles. Parameters, a, b and β are ageing factors that may scale SA with time. During oxidation/reduction process in a voltage cycle, two types of oxides (PtO and PtOO) are formed which injects vacancies at different rates. Parameter k included in Eq. 2 may represent the contribution of vacancies formed by PtOO compared to PtO FIG. 3 illustrates a flow chart of an exemplary method 300 for initiating voltage recovery in a FC system consistent with embodiments disclosed herein. In some embodiments, the illustrated method 300 and/or any of its constituent steps may be performed using, at least in part, a FC control and/or any other suitable computer system.

The method 300 may initiate at 302. At 304, ECA, a parasitic current and/or hydrogen crossover, $i_x$, and/or a shorting resistance $R_s$ of the FC system may be estimated. During vehicle shut-down, the drop in FC voltage to zero may be defined in three different stages. The information on voltage drop in these stages may be used to extract parameters such as ECA, a parasitic current and/or hydrogen crossover, $i_x$, and/or a shorting resistance $R_s$ of the FC system. In some embodiments, ECA loss may be determined using embodiments of the systems and methods disclosed in commonly-assigned U.S. Pat. No. 8,450,020, entitled "In-vehicle algorithm for fuel cell stack health quantification," which is hereby incorporated by reference in its entirety.

At 306, SA of the catalyst in the FC system may be estimated. In certain embodiments, the SA of the catalyst in the FC system may be estimated based on oxide growth information (e.g., oxide growth and oxide growth rate information) as discussed above.

Based on the information estimated at 304 and 306, an estimated output voltage, $V_{est}$, of the FC system at a particular current density may be determined at 308. In certain embodiments, the estimated output voltage may be determined using a performance model of the FC system. In some embodiments, a FC control system may comprise a performance estimation module configured to evaluate power or cell voltage at a particular current density. The performance estimation module may receive as inputs material properties defined at BOL of the FC and operation conditions of the FC during a drive cycle. Inputs associated with a catalyst may include ECA and SA, which may decay during operation. In certain embodiments, the estimated output voltage may be determined at relatively low current densities. For example, in some embodiments, the estimated output voltage may be determined at a current density less than 0.4 $A \cdot cm^{-2}$.

At 310, a steady state voltage measurement may be performed to obtain an actual output voltage, $V_{actual}$, of the FC system. In some embodiments, the actual output voltage may be obtained at relatively lower power (i.e., relative low current densities). At 312, a difference between the estimated output voltage and the actual output voltage may be compared against a threshold voltage difference. In certain embodiments, the difference between the estimated output voltage calculated based on the information estimated at 304 and 306 and the actual output voltage may comprise a voltage loss that may be recoverable through a voltage recovery procedure.

If the recoverable voltage does not exceed the threshold, the method 300 may proceed to 318, where it may be determined whether a counter associated with the method 300 has exceeded a certain period of time (e.g., a certain number of hours). If so, the method 300 may return to 310. Otherwise, the method 300 may terminate at 320. In some embodiments, the counter may comprise a signal that, upon receipt, may initiate and/or otherwise prompt a recovery strategy.

If the recoverable voltage exceeds the threshold voltage, the method 300 may proceed to 314, where voltage recovery procedures in the FC system may be initiated. A variety of voltage recovery procedures may be initiated in connection with the disclosed embodiments. For example, in some embodiments, a voltage recovery procedure may comprise operating the FC system at a relatively low flow rate and a relatively low voltage (e.g., 0.3V or the like) and increasing cooling of the FC stack and humidification of the stack. Such wet and cold FC system operation at relatively low voltage may operate to recover recoverable voltage loss experienced by the FC system.

In some embodiments, the voltage recovery procedure may initiate immediately upon determining that the recoverable voltage exceeds the threshold voltage at 314. In other embodiments, the voltage recovery procedure may be flagged for initiation following the determination at 314 at a time when the voltage recovery procedure will not adversely affect vehicle performance (e.g., based on use of the vehicle and/or the like). In certain embodiments, the voltage recovery procedure may be performed over a single time window. In further embodiments, the voltage recovery procedure may be performed opportunistically (e.g., based on vehicle use) over a plurality of time windows, relying on the cumulative effects of such procedures to achieve voltage loss recovery.

At 318, the counter used in connection with the method 300 may be reset. The method 300 may proceed to terminate at 320.

Figure 4:
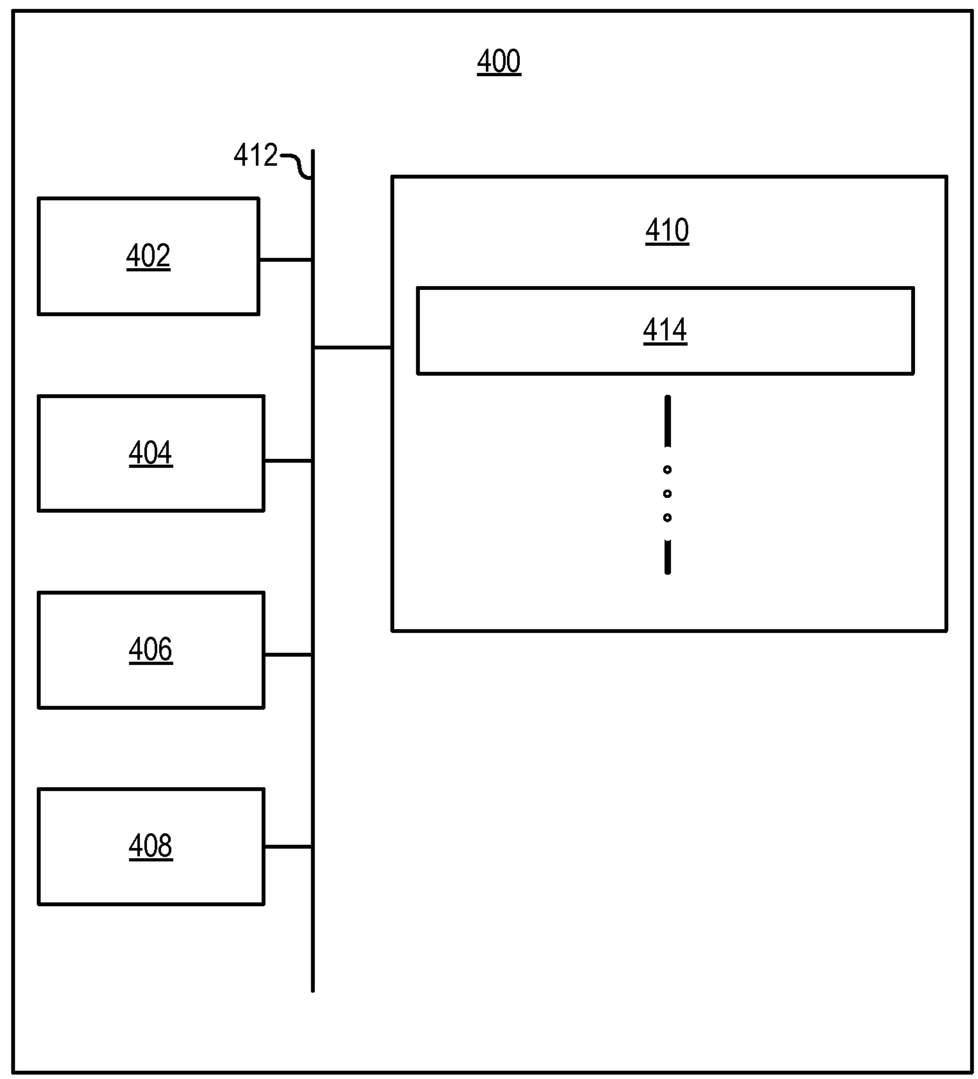
FIG. 4 illustrates a diagram of an exemplary system that may be used to implement various embodiments of the disclosed systems and methods.

FIG. 4 illustrates an exemplary system for implementing certain embodiments of the systems and methods disclosed herein. In certain embodiments, the computer system 400 may be a personal computer system, a server computer system, an on-board vehicle computer, an internal FC control system, an external FC control system, and/or any other type of system suitable for implementing the disclosed systems and methods. In further embodiments, the computer system 400 may be any portable electronic computer system or electronic device including, for example, a notebook computer, a smartphone, and/or a tablet computer.

As illustrated, the computer system 400 may include, among other things, one or more processors 402, random access memory ("RAM") 404, a communications interface 406, a user interface 408, and a non-transitory computer-readable storage medium 410. The processor 402, RAM 404, communications interface 406, user interface 408, and computer-readable storage medium 410 may be communicatively coupled to each other via a common data bus 412. In some embodiments, the various components of the computer system 400 may be implemented using hardware, software, firmware, and/or any combination thereof.

The user interface 408 may include any number of devices allowing a user to interact with the computer system 400. For example, the user interface 408 may be used to display an interactive interface to a user. The user interface 408 may be a separate interface system communicatively coupled with the computer system 400 or, alternatively, may be an integrated system such as a display interface for a laptop or other similar device. In certain embodiments, the user interface 408 may be produced on a touch screen display. The user interface 408 may also include any number of other input devices including, for example, keyboard, trackball, and/or pointer devices.

The communications interface 406 may be any interface capable of communicating with other computer systems, peripheral devices, and/or other equipment communicatively coupled to computer system 400. For example, the communications interface 406 may allow the computer system 400 to communicate with other computer systems (e.g., computer systems associated with external databases and/or the Internet), allowing for the transfer as well as reception of data from such systems. The communications interface 406 may include, among other things, a modem, a satellite data transmission system, an Ethernet card, and/or any other suitable device that enables the computer system 400 to connect to databases and networks, such as LANs, MANs, WANs and the Internet. In further embodiments, the communications interface 406 may further be capable of communication with one or more sensors (e.g., current sensors, voltage sensors) and/or other systems configured to measure and/or otherwise provide information for use in connection with the disclosed embodiments.

Processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 402 may be configured to execute computer-readable instructions stored on non-transitory computer-readable storage medium 410. Computer-readable storage medium 410 may store other data or information as desired. In some embodiments, the computer-readable instructions may include computer executable functional modules 414. For example, the computer-readable instructions may include one or more functional modules configured to implement all or part of the functionality of the systems and methods described above. Specific functional models that may be stored on computer-readable storage medium 410 may include a module configured to estimate ECA and SA, a module configured to estimate an output voltage of a FC system, a module configured to determine an actual output voltage of a FC system, a module configured to determine a recoverable voltage loss, a module configured to initiate and/or otherwise control voltage recovery procedures, and/or any other module or modules configured to implement the systems and methods disclosed herein.

Although the foregoing has been described in some detail for purposes of clarity, it will be apparent that certain changes and modifications may be made without departing from the principles thereof. For example, in certain embodiments, the systems and methods disclosed herein may be utilized in FC systems not included in a vehicle (e.g., as in back-up power sources or the like). It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "in communication," "coupled," "coupling," and any other variation thereof are intended to encompass a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A method of controlling a fuel cell system based on a determined recoverable voltage loss in the fuel cell system performed by a system comprising a processor and a communicatively-coupled non-transitory computer readable storage medium storing instructions that, when executed by the processor, cause the processor to perform the method comprising:

- estimating specific activity loss of a catalyst of a fuel cell system;
- estimating electrochemical surface area loss of the fuel cell system;
- estimating an output voltage of the fuel cell system based on the estimated specific activity loss and the electrochemical surface area loss;
- measuring an actual output voltage of the fuel cell system;
- determining an amount of recoverable voltage loss based on a comparison between the estimated output voltage and the actual output voltage; and
- implementing at least one fuel cell system control action based on the determined amount of recoverable voltage loss, the at least one fuel cell system control action comprising initiating a voltage recovery procedure in the fuel cell system, the voltage recovery procedure comprising operating the fuel cell system at a lower than standard operational flow rate and voltage, increasing humidification of the fuel cell system, and increasing cooling of the fuel cell system by an associated cooling for a period of time.

2. The method of claim 1, wherein determining the amount of recoverable voltage loss comprises determining that a difference between the estimated output voltage and the actual output voltage exceeds a threshold.

3. The method of claim 2, wherein initiating the voltage recovery procedure comprises initiating the voltage recovery procedure upon determining that the difference between the estimated output voltage and the actual output voltage exceeds the threshold.

4. The method of claim 2, wherein initiating the voltage recovery procedure comprises initiating the voltage recovery procedure at a future time following determining that the difference between the estimated output voltage and the actual output voltage exceeds the threshold.

5. The method of claim 1, estimating the output voltage of the fuel cell system is further based on a performance model of the fuel cell system.

6. The method of claim 1, wherein estimating output voltage of the fuel cell system comprises estimating the output voltage of the fuel cell system at a set current density.

7. The method of claim 1, wherein the fuel cell system comprises a single cell.

8. The method of claim 1, wherein the fuel cell system comprises a plurality of cells.

9. The method of claim 1 wherein estimating the specific activity loss of the catalyst of the fuel cell system is based, at least in part, on an amount of oxide growth and an oxide growth rate in the fuel cell system.

10. A non-transitory computer-readable medium comprising instructions that, when executed by a processor, cause the processor to perform a method of controlling a fuel cell system based on a determined recoverable voltage loss in the fuel cell system, the method comprising:

- estimating specific activity loss of a catalyst of a fuel cell system;
- estimating electrochemical surface area loss of the fuel cell system;
- estimating an output voltage of the fuel cell system based on the estimated specific activity loss and the electrochemical surface area loss;
- measuring an actual output voltage of the fuel cell system;
- determining an amount of recoverable voltage loss based on a comparison between the estimated output voltage and the actual output voltage; and
- implementing at least one fuel cell system control action based on the determined amount of recoverable voltage loss, the at least one fuel cell system control action comprising initiating a voltage recovery procedure in the fuel cell system, the voltage recovery procedure comprising operating the fuel cell system at a lower than standard operational flow rate and voltage, increasing humidification of the fuel cell system, and increasing cooling of the fuel cell system by an associated cooling for a period of time.

11. The non-transitory computer-readable medium of claim 10, wherein determining the amount of recoverable voltage loss comprises determining that a difference between the estimated output voltage and the actual output voltage exceeds a threshold.

12. The non-transitory computer-readable medium of claim 11, wherein initiating the voltage recovery procedure comprises initiating the voltage recovery procedure upon determining that the difference between the estimated output voltage and the actual output voltage exceeds the threshold.

13. The non-transitory computer-readable medium of claim 11, wherein initiating the voltage recovery procedure comprises initiating the voltage recovery procedure at a future time following determining that the difference between the estimated output voltage and the actual output voltage exceeds the threshold.

14. The non-transitory computer-readable medium of claim 10, estimating the output voltage of the fuel cell system is further based on a performance model of the fuel cell system.

15. The non-transitory computer-readable medium of claim 10, wherein estimating output voltage of the fuel cell system comprises estimating the output voltage of the fuel cell system at a set current density.

16. The non-transitory computer-readable medium of claim 10, wherein the fuel cell system comprises a single cell.

17. The non-transitory computer-readable medium of claim 10, wherein the fuel cell system comprises a plurality of cells.

18. The non-transitory computer-readable medium of claim 10, wherein estimating the specific activity loss of the catalyst of the fuel cell system is based, at least in part, on an amount of oxide growth and an oxide growth rate in the fuel cell system.

* * * * *